United States Patent
Mijalkovic et al.

(10) Patent No.: US 6,870,348 B2
(45) Date of Patent: Mar. 22, 2005

(54) ROTOR RESISTANCE ADAPTATION FOR INDIRECT FIELD ORIENTED CONTROL OF INDUCTION MACHINE

(75) Inventors: Milan S. Mijalkovic, Beograd (YU); Aleksandar M. Stankovic, Boston, MA (US); Silva Hiti, Redondo Beach, CA (US); James M. Nagashima, Cerritos, CA (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/635,214

(22) Filed: Aug. 6, 2003

(65) Prior Publication Data

US 2005/0029983 A1 Feb. 10, 2005

(51) Int. Cl.[7] .............................. H02P 5/28; H02P 7/36
(52) U.S. Cl. ........................ 318/818; 318/821
(58) Field of Search ................................ 318/727, 818, 318/804, 821

(56) References Cited

U.S. PATENT DOCUMENTS

| | | | | | |
|---|---|---|---|---|---|
| 4,447,787 | A | * | 5/1984 | Schwesig et al. | 318/803 |
| 4,724,373 | A | * | 2/1988 | Lipo | 318/805 |
| 4,885,520 | A | * | 12/1989 | Sugimoto et al. | 318/808 |
| 5,160,878 | A | * | 11/1992 | Nagano | 318/800 |
| 5,166,593 | A | * | 11/1992 | De Doncker et al. | 318/800 |
| 5,170,116 | A | * | 12/1992 | Bavard et al. | 324/772 |
| 5,172,041 | A | * | 12/1992 | Bavard et al. | 318/803 |
| 5,334,923 | A | * | 8/1994 | Lorenz et al. | 318/805 |
| 5,510,689 | A | * | 4/1996 | Lipo et al. | 318/809 |
| 5,610,485 | A | * | 3/1997 | Depenbrock et al. | 318/432 |
| 5,719,482 | A | * | 2/1998 | Kunzel | 318/800 |
| 6,281,659 | B1 | * | 8/2001 | Giuseppe | 318/799 |
| 6,326,762 | B1 | * | 12/2001 | Jiang et al. | 318/811 |
| 6,448,735 | B1 | * | 9/2002 | Gokhale et al. | 318/700 |
| 6,741,059 | B2 | * | 5/2004 | Gokhale et al. | 318/700 |

OTHER PUBLICATIONS

F.Z. Peng and T. Fukao, "Robust speed indentification for speed sensorless vector control of induction motors." In IEEE Transactions on Industry Applications, vol. 30, No. 5, Sep./Oct., 1994.

L.A.S. de Souza–Ribeiro, C.B. Jacobina, A.M. Noguei-ra–Lima, A.C. Oliveira, "Parameter sensitivity of MRAC models employed in IFO–controlled AC motor drive." In IEEE Transactions on Industrial Electronics, vol. 44, No. 4, Aug. 1997.

R.D. Lorenz and D.B. Lawson, "A simplified approach to continuous on–line tuning of field oriented induction machine drives." In Proceedings of the IEEE IAS Annual Meeting, pp. 444–449, 1988.

S. Vukosavic, M. Stojic, "On–Line Tuning of the Rotor Time Constant for Vector–Controlled Induction Motor in Position Control Applications" IEEE Trans. on Industry Application, vol. 40, No. 1, 1993, pp 130–138.

* cited by examiner

*Primary Examiner*—David Martin
*Assistant Examiner*—Patrick Miller
(74) *Attorney, Agent, or Firm*—Christopher DeVries (57) ABSTRACT

An induction machine includes a rotor having rotor flux and a rotor resistance. The induction machine outputs first and second reference current values. A control system includes a first controller that outputs first and second reference voltage values to the induction machine and that generates an estimated rotor flux magnitude value based on a rotor resistance parameter. A computation circuit receives the first and second reference current values from the induction machine and the first and second voltage reference values from the first controller and calculates an actual rotor flux magnitude. A rotor resistance adjustor that updates the rotor resistance parameter based on the actual and estimated rotor flux magnitudes.

17 Claims, 6 Drawing Sheets

ROTOR RESISTANCE ADAPTATION FOR INDIRECT FIELD ORIENTED CONTROL OF INDUCTION MACHINE

FIELD OF THE INVENTION

The present invention relates to induction machines, and more particularly to the control of induction machines.

BACKGROUND OF THE INVENTION

Indirect field-oriented control (IFOC) is commonly used control method for a three-phase induction machine (IM). If motor parameters of the IM are known, the IFOC reduces the complex IM dynamics to the dynamics of a separately excited dc machine. Using this approach allows the flux and torque of the induction machine to be controlled independently.

The induction machine model used in IFOC controller is given by the following equations:

$$\omega_s = \omega_e - \omega_r = \frac{R_r}{L_r} \frac{M}{\Psi_{dr}} i_{qs} \quad (1)$$

$$R_r \Psi_{dr} + L_r \frac{d\Psi_{dr}}{dt} = R_r M i_{ds} \quad (2)$$

$$T_e = 3/2 \, P \frac{M}{L_r} (\Psi_{dr} i_{qs}) \quad (3)$$

In equations (1)–(3), $i_{ds}$ and $i_{qs}$ are flux and torque producing stator current components, respectively. $\Psi_{dr}$ is a rotor flux magnitude.

The assumption of the IFOC is that $\dot{\Psi}_{dr}=0$ and that the stator current components are controlled by the current control loop. $R_r$ is a rotor resistance, M is a mutual inductance, and $L_r=M+L_{lr}$ is a rotor inductance. $L_{lr}$ is a rotor leakage inductance and $L_{lr}\ll M$. Also, $\omega_e$ is a stator electrical frequency, $\omega_e$ is a rotor electrical frequency, $\omega_s$ is a slip frequency, and $T_e$ is a produced torque.

The performance of the IFOC is sensitive to discrepancies between estimated machine parameters used by the IFOC and actual machine parameters. During operation, the actual machine parameters drift from nominal or estimated values due to changes in operating conditions. If the estimated parameters stored in the IFOC controller do not reflect the actual machine parameters, a parameter mismatch occurs. As a result, the machine flux level is not properly maintained. Torque response linearity is also lost. In other words, produced torque is different from the commanded value. The discrepancy also typically exists in steady-state conditions. Finally, the torque response to step torque command is not instantaneous.

The mutual inductance M and the rotor resistance $R_r$ have a significant impact on the performance of the IFOC. The mutual inductance M varies significantly with the machine saturation level. The variation of the mutual inductance with the flux level can be compensated using look-up tables that may be obtained during off-line characterization. The rotor resistance $R_r$ is predominantly influenced by rotor temperature. Since the rotor temperature varies with machine operating conditions, the rotor resistance must be estimated using on-line approaches for tracking the rotor resistance variations during machine operation.

Figure 1:
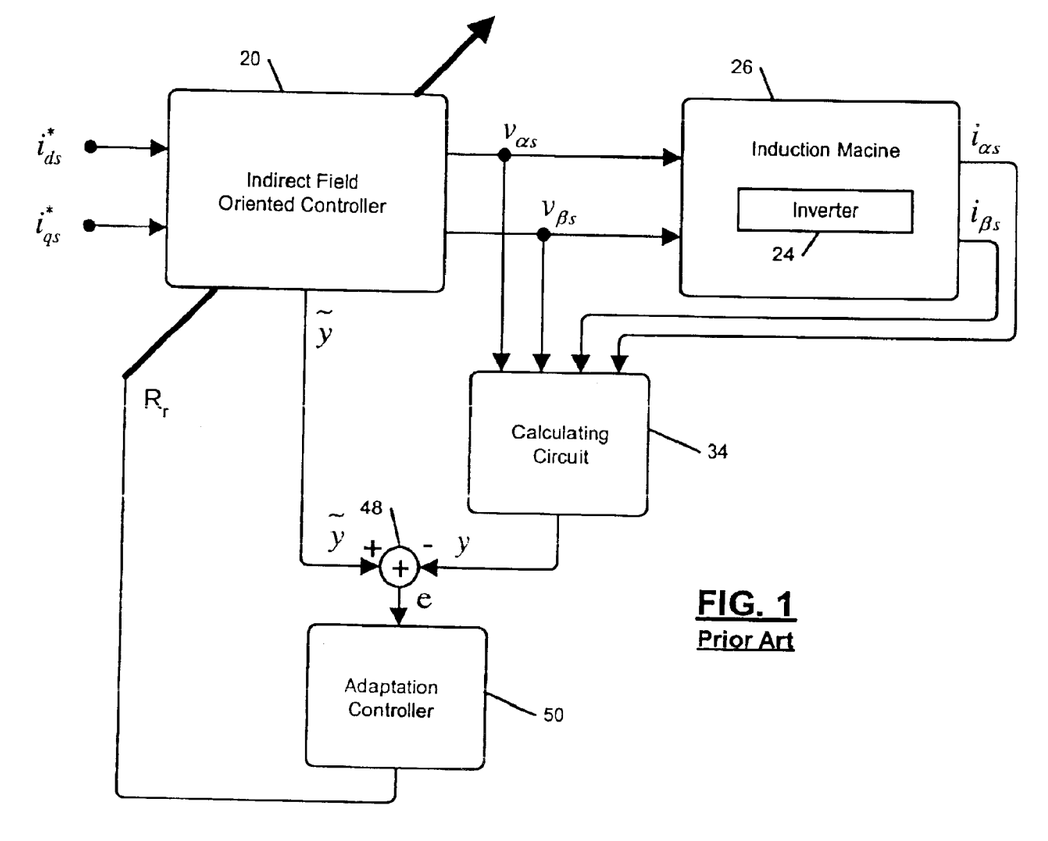
FIG. 1 is a functional module diagram of an indirect field oriented control (FOC) with model reference adaptive control (MRAC) tuning according to the prior art.

Referring now to FIG. 1, the commanded values for flux and torque producing stator current components $i_{ds}^*$ and $i_{qs}^*$ respectively, are inputs to an IFOC 20. The IFOC 20 outputs reference voltages, $v_a$, $v_b$ and $v_c$, which are fed to a power inverter 24 of an induction motor 26. A calculating circuit 34 calculates a function y from measured quantities, including voltages $v_a$, $v_b$ and $v_c$ and phase currents $i_a$, $i_b$, and $i_c$. The same function is calculated in IFOC by using the internal variables and is denoted as $\tilde{y}$.

A difference, $e=\tilde{y}-y$, that is generated by a difference circuit 48 is input to an adaptation controller 50. The output of the adaptation controller 50 determines the rotor resistance value $R_r$ that is used in IFOC 20. If the function y is sensitive to the rotor resistance, any difference between the motor $R_r$ value and the IFOC Rr value produces a non-zero error ($e=\tilde{y}\neq 0$). The non-zero error will force the $R_r$ value used in IFOC to change.

Conventional IFOC use several different functions including: reactive power (Q); electromagnetic torque (Te); active power (P); a ratio of reactive power and electromagnetic torque (Q/Te); and, a scalar product of transposed rotor flux vector and stator current vector ($\Psi_r^T i_s$). These functions, however, are not sufficiently sensitive to changes in the rotor resistance $R_r$ or are impractical for real-time implementation. As a result, parameter drift and reduced performance occurs.

SUMMARY OF THE INVENTION

A control system includes a first controller that outputs reference voltage values to an induction machine. The first controller also generates an estimated rotor flux magnitude value based on a rotor resistance parameter. A computation circuit receives the measured current values from the induction machine and the voltage reference values from the first controller and calculates an actual rotor flux magnitude. A rotor resistance adjustor updates the rotor resistance parameter in the controller based on the actual and estimated rotor flux magnitudes.

In other features, a difference circuit calculates a difference between the estimated and actual rotor flux magnitudes and outputs the difference to the rotor resistance estimator. The first controller is an indirect field-oriented controller (IFOC) that receives commanded values for flux and torque producing stator current values.

In still other features, the rotor resistance adjustor is disabled at rotor slip values below a predetermined threshold and enabled for rotor slip values above the predetermined threshold.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. For purposes of clarity, the same reference numbers will be used in the drawings to identify the similar elements. As used herein, the term module means a discrete circuit, a processor and software and/or firmware, an application specific integrated circuit, combinatorial logic and/or other similar devices.

Figure 2:
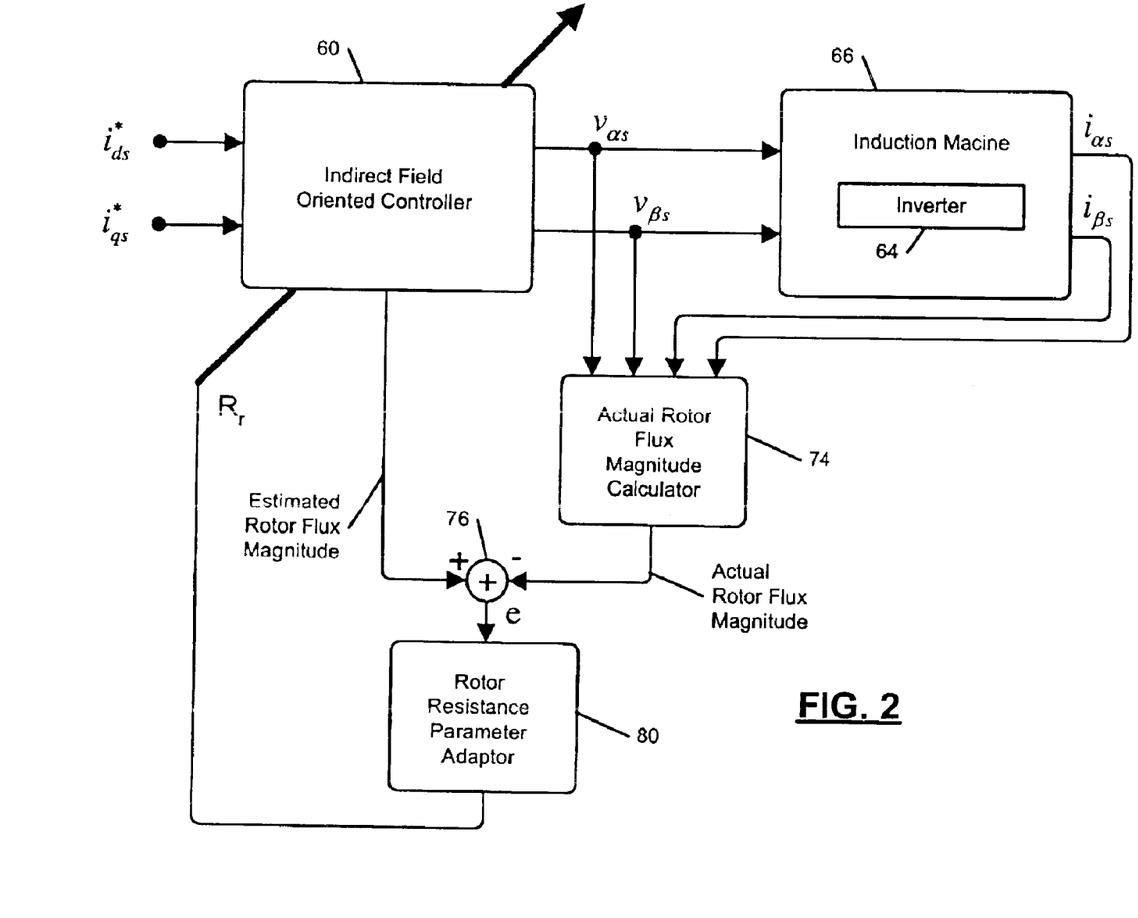
FIG. 2 is a functional module diagram of an indirect field oriented control (FOC) with model reference adaptive control (MRAC) tuning that employs a square of the rotor flux magnitude to estimate rotor resistance according to the present invention.

Referring now to FIG. 2, commanded values for flux and torque producing stator current components $i_{ds}^*$ and $e_{qs}^*$, respectively, are input to an IFOC 60. The IFOC 60 outputs reference voltages $v_a$, $v_b$, and $v_c$, which are fed to a power inverter 64 of an induction motor 66. A calculating circuit 74 calculates an actual rotor flux magnitude ($|\Psi_r|^2$) from measured quantities, including voltages $v_a$, $v_b$, and $v_c$ and phase currents $i_a$, $i_b$, and $i_c$. An estimated rotor flux magnitude $|\Psi_r|^2$ is calculated in the IFOC 60 using internal variables.

A difference (e) between the estimated and actual rotor flux magnitude is output by a difference circuit 76 to a rotor resistance parameter adaptor 80. The output of the rotor resistance parameter adaptor 80 determines the rotor resistance value $R_r$ that is used in the IFOC 60. Since the function ($|\Psi_r|^2$) is sensitive to the rotor resistance $R_r$, any difference between the actual $R_r$ value and the estimated $R_r$ value produces a non-zero error. The non-zero error forces the $R_r$ value used in the IFOC 60 to change.

The square of the amplitude of the rotor flux ($|\Psi_r|^2$) is used by the adaptation controller 80 according to the present invention to significantly improve performance. For a selected function, $y=y(R_r)$, the relative sensitivity is defined as:

$$\overline{S}_{R_r}^y = \frac{R_r}{y} \frac{\partial y}{\partial R_r} \quad (4)$$

The relative sensitivity function shows how a relative change of $R_r$ affects the adaptation function y. Preferably the absolute value of the sensitivity function $|\overline{S}_{R_r}^y|$ is as high as possible over the operating range. Also, $\overline{S}_{R_r}^y$ should not change sign over the desired operating range in order to make the implementation simple and practical. Besides having high sensitivity to $R_r$ changes, the y function should be easily quantifiable from the measured quantities.

Figure 3:
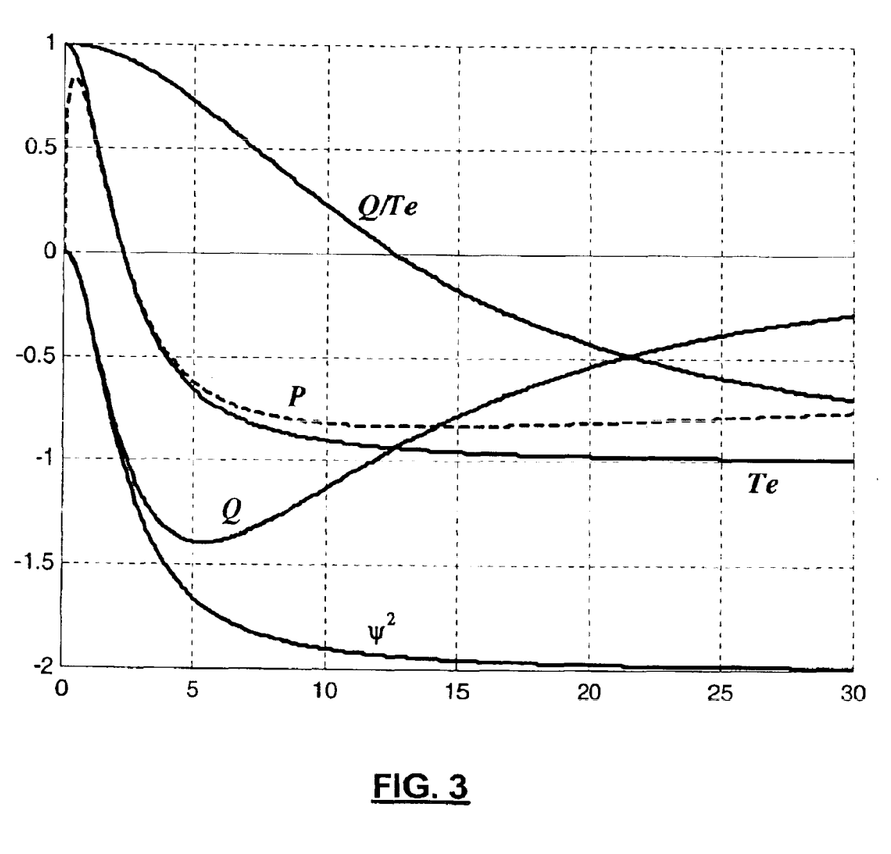
FIG. 3 is a plot illustrating relative sensitivity as a function of slip frequency.
Figure 4:
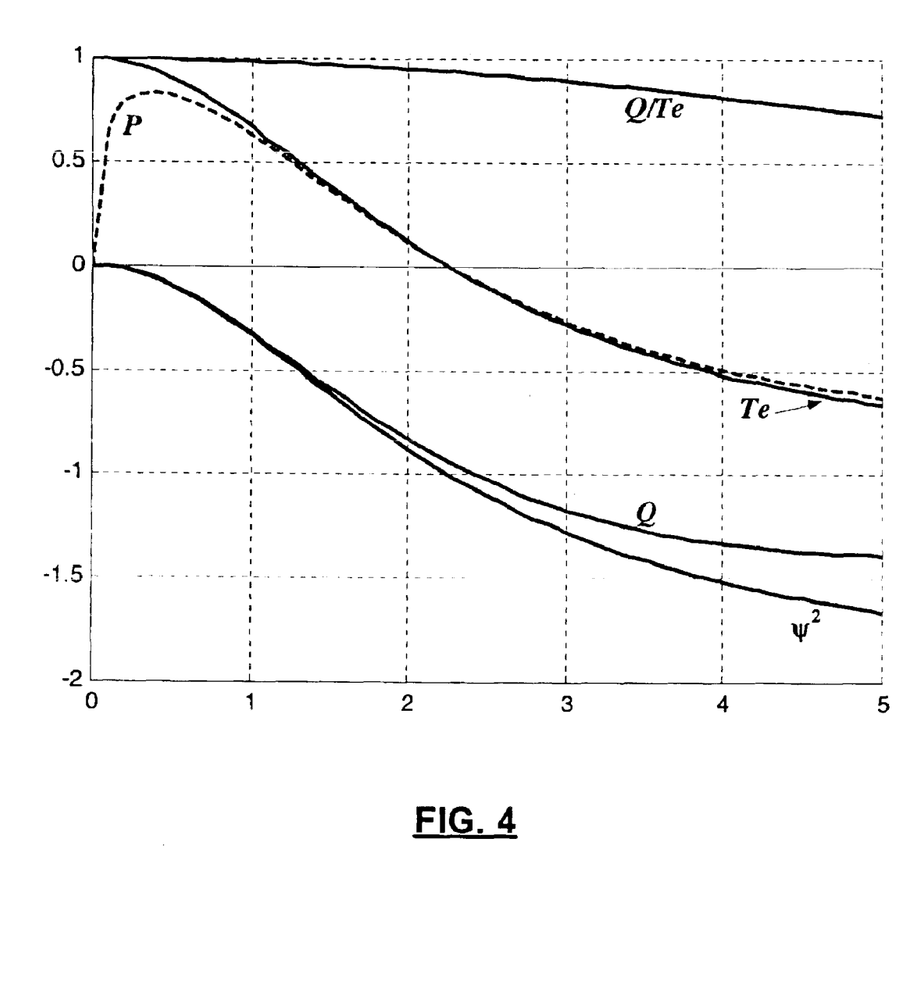
FIG. 4 is an expanded plot of FIG. 3 for low values of slip frequency.

FIGS. 3 and 4 are plots of sensitivity vs. slip frequency for all function candidates. The calculations were performed on a motor that was specifically designed for electric vehicle applications. If different motor designs are used, the relative ranking of functions may change somewhat. However, the conclusions that are drawn herein are valid for a large number of induction motor designs and applications.

Sensitivity functions for electromagnetic torque, active power and ratio of reactive power to electromagnetic torque have signs that depend on the operating slip frequency, which makes these functions very difficult to implement.

The crossing points are in the middle of the operating slip frequency range. Rotor resistance adaptations using these functions require complicated algorithms to detect and accommodate the sign change.

The Q and $|\Psi_r|^2$ functions have notably lower sensitivity for low slip values as compared with other functions. However, $\overline{S}_{R_r}^Q$ and $\overline{S}_{R_r}^{|\Psi_r|^2}$ do not change sign with the slip frequency. In addition, Q and $|\Psi_r|^2$ can be easily calculated from both the IFOC variables and the stator-side measured currents and voltages. Out of all of the functions, the $|\Psi_r|^2$ function has the largest magnitude of the sensitivity function $|\overline{S}_{R_r}^{|\Psi_r|^2}|$ at higher slip frequencies. This region typically corresponds to high torque values and high rotor losses. Due to rotor heating, the rotor resistance $R_r$ can deviate significantly from its nominal value. For this reason, the large value of $|\overline{S}_{R_r}^{|\Psi_r|^2}|$ Mat high slip frequencies is of particular importance.

However, $|\overline{S}_{R_r}^{|\Psi_r|^2}|$ is lower under light load conditions, as shown in FIG. 4. Considering typical measurement accuracy and noise levels, it is possible to detect $|\Psi_r|^2$ changes of 5% of the maximal value and higher. This guideline may be used to determine the slip frequency threshold below which the adaptation mechanism can be disabled. It follows then, from FIG. 3 and equation (5), that for the particular example used here, at the slip frequency of about 1.4 rad/s (0.2 Hz) and higher, a 10%-variation of the rotor resistance is detectable, since $|\overline{S}_{R_r}^{|\Psi_r|^2}|=0.5$. For slip frequencies below this threshold, the adaptation mechanism is preferably disabled. This is acceptable because the influence of tuning error is very small under light load conditions. The function $\Psi_r^T i_s$, has similar properties as the proposed function $|\Psi_r|^2$. However, the implementation of $\Psi_r^T i_s$ is more complicated and inaccurate under certain conditions.

The magnitude of the rotor flux is inherently calculated in IFOC (equation (2)). In other words, the IFOC outputs $|\Psi_r|^2$. In the adaptation approach in FIG. 2, it is necessary to find a way of calculating $|\Psi_r|^2$ from measured stator currents and voltages, under the underlying assumption of rotor field-orientation. The instantaneous reactive power q is given by $$q = v_s^T J i, \quad (5)$$

where $v_s^T$ and $i_s^T$ are stator voltage and current vectors, respectively, and J is given by:

$$J = \begin{bmatrix} 0 & -1 \\ 1 & 0 \end{bmatrix} \quad (6)$$

Equation (5) is valid in the stationary reference frame, as well as in the rotating field-oriented synchronous reference frame, i.e.

$$q = v_s^T J i_g \quad (7)$$
$$= v_{ds} i_{qs} - v_{qs} i_{ds}$$
$$= v_{\alpha s} i_{\beta s} - v_{\beta s} i_{\alpha s}$$

The stator voltage equation in the rotating reference frame, in vector form, and in terms of the stator currents and flux linkages is given by:

$$v_s = R_s i_s + \omega_e J \Psi_s \dot{\Psi}_s \quad (8)$$

where $$\psi_s = L_s \sigma i_s + \frac{M}{L_r}\psi_r \text{ and} \tag{9}$$

$$\dot{\psi}_s = L_s \sigma \dot{i}_s + \frac{M}{L_r}\dot{\psi}_r + \left(\frac{\partial}{\partial t}\left(\frac{M}{L_r}\right)\right)\psi_r \tag{10}$$

and

In equation (10), $\partial/\partial t(M/L_r)=0$. Moreover, assuming that the rotor flux is in steady state, or $\dot{\Psi}_r=$, equation (10) simplifies to:

$$\dot{\Psi}_s = L_s \sigma \dot{i}_s \tag{11}$$

Substituting (8), (9) and (11) into (5), the instantaneous relative power is:

$$q = \omega_e L_s \sigma i_s^T i_s + L_s \sigma i_s^T J i_s + \omega_e \frac{M}{L_r}\psi_r^T i_s \tag{12}$$

Equation (12) does not require knowledge of the stator resistance value $R_s$. This is important since the stator resistance value $R_s$ changes significantly with the operating conditions. Assuming rotor field orientation, the equation (12) can further be simplified into:

$$q = L_s \sigma i_{\alpha\beta s}^T i_{\alpha\beta s} + \frac{\omega_e}{L_r}|\psi_r|^2 \tag{13}$$

where $i_{\alpha\beta s}$ is the stator current vector in the stationary reference frame.

Finally, it follows from equations (7) and (13) that:

$$|\psi_r|^2 = \left((v_{\beta s}i_{\alpha s} - v_{\alpha s}i_{\beta s}) - L_s\sigma\left(i_{\alpha s}\frac{di_{\beta s}}{dt} - i_{\beta s}\frac{di_{\alpha s}}{dt}\right)\right)\frac{L_r}{\omega_e} \tag{14}$$

Equation (14) can be used to calculate $|\Psi_r|^2$ from the measured quantities in the stationary reference frame. For a typical induction machine, the stator leakage inductance (Lσ) is approximately constant and does not vary significantly with the stator current. However, if the stator leakage inductance does vary substantially, a look-up table can be used. Note that for steady state conditions, equation (14) becomes much simpler:

$$|\psi_r|^2 = \left(\frac{v_{\beta s}i_{\alpha s} - v_{\alpha s}i_{\beta s}}{\omega_e} - L_s\sigma|i_s|^2\right)L_r \tag{15}$$

Figure 6:
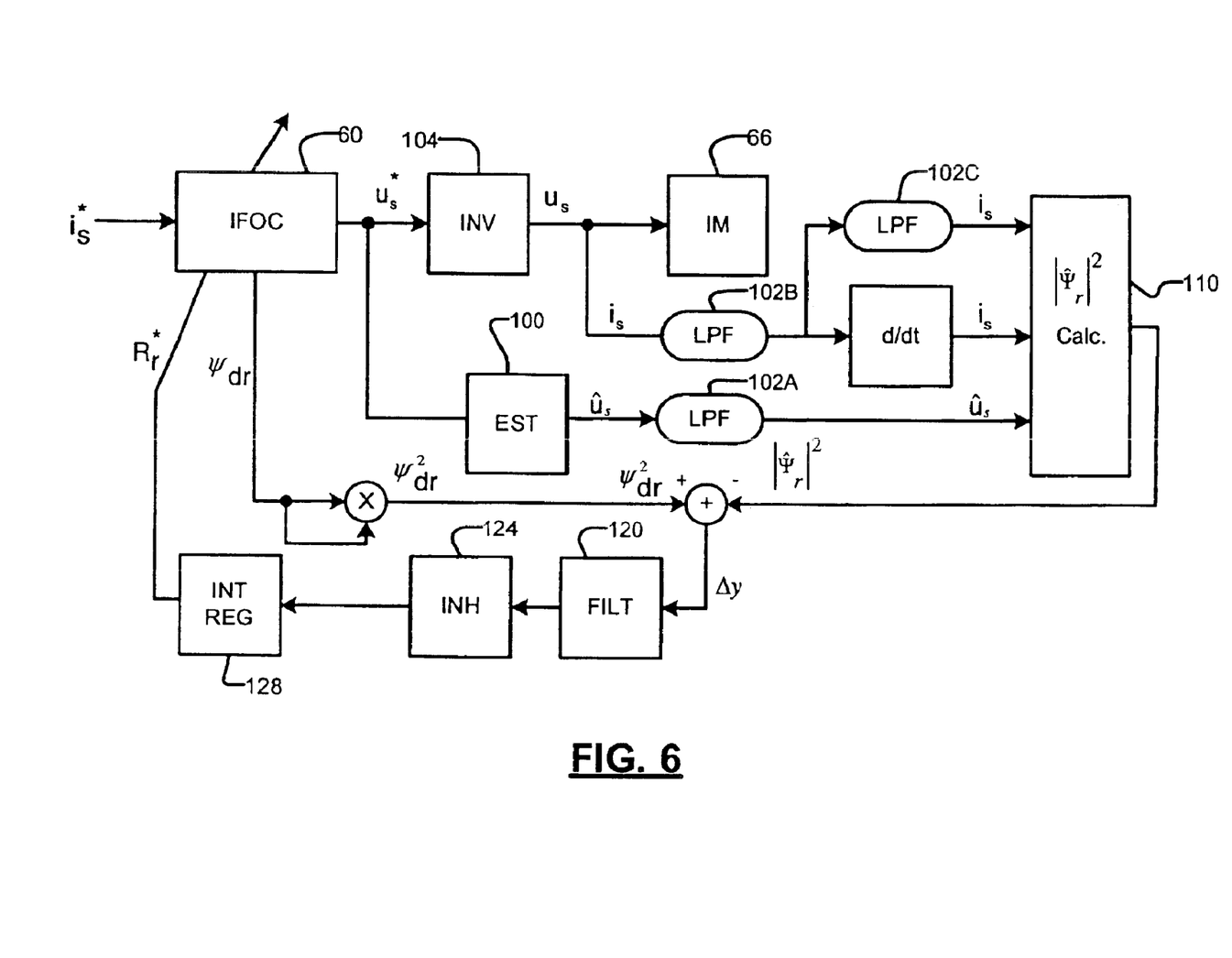
FIG. 6 is a functional block diagram of an exemplary device for measuring a square of the rotor flux.

Referring now to FIG. 6, one exemplary implementation of equation (14) is depicted. Besides the information of stator currents, equation (14) needs the derivatives of the currents and the stator voltages, which are difficult to measure. Stator voltages can be estimated from the commanded voltage vector $u_s^*$ in estimating module (EST) 100, which performs the following computations:

$$\hat{u}_{as} = u_{as}^* - E\frac{\Delta T}{T}sgn(i_{as}) + \frac{u_{as}^*}{E}(V_d - V_{ce}) - \frac{1}{2}(V_d + V_{ce})sgn(i_{as}) \tag{16}$$

$$\hat{u}_{bs} = u_{bs}^* - E\frac{\Delta T}{T}sgn(i_{bs}) + \frac{u_{bs}^*}{E}(V_d - V_{ce}) - \frac{1}{2}(V_d + V_{ce})sgn(i_{bs})$$

-continued $$\hat{u}_{cs} = u_{cs}^* - E\frac{\Delta T}{T}sgn(i_{cs}) + \frac{u_{cs}^*}{E}(V_d - V_{ce}) - \frac{1}{2}(V_d + V_{ce})sgn(i_{cs})$$

In equation (16), the voltages $u_{as}^*$, $u_{bs}^*$ and $u_{cs}^*$ are available from the controller 60 and are typically between $-E/2$ and $+E/2$, where E is a DC-link voltage. Currents $i_{as}$, $i_{bs}$ and $i_{cs}$ are measured line-currents. $V_{ce}$ and $V_d$ are the saturation voltage and the free-wheeling diode voltage, respectively. T is a period of the applied PWM and $\Delta T$ is the lockout time of power switches. When the DC-link voltage is much higher than the saturation voltage, a practical simplification of (16) can be made as:

$$\hat{u}_{xs} \approx u_{xs}^* - Dsgn(i_{xs}) \tag{17}$$

where subscript x stands for a, b or c, and D is a constant that can be calculated (or determined experimentally). The actual implementation strongly depends on the DC-link voltage and type of the power switches used in the inverter.

The estimated stator voltages are further transformed in α-β frame using equation (18):

$$\hat{u}_{\alpha s} = \frac{2}{3}\hat{u}_{as} - \frac{1}{3}(\hat{u}_{bs} + \hat{u}_{cs}) \tag{18}$$

$$\hat{u}_{\beta s} = \frac{\sqrt{3}}{3}(\hat{u}_{bs} - \hat{u}_{cs})$$

Usually, the currents are measured by means of two current sensors (for a Y-connected machine). In this case currents in the stationary frame are:

$$i_{\alpha s} = i_{as} \tag{19}$$

$$i_{\beta s} = \frac{\sqrt{3}}{3}(i_{bs} - i_{cs})$$

The time derivatives of the currents are vales that can introduce a large amount of noise in the estimation, especially at lower speeds. To decrease the noise and its influence on the adaptation algorithm, it is necessary to implement a special procedure for derivative calculation. The method according to the present invention uses an adaptive derivation time that varies for different $\omega_e$. The time derivative of a variable is calculated as an increment of this variable for the defined time. Usually, the increment is calculated for one or several sampling periods. For extremely low electrical speeds (let us assume 0.1 Hz, which is normal for zero rotor speed), the current (usually sampled with a rate above 10 kHz), changes by a very small amount between two consecutive samples. In the mentioned example, the current needs 2500 ms (or more than 25000 sampling intervals) to change from zero to its maximal value. It is impractical to extract the information of the derivative from consecutive sampling intervals because it is masked by the noise that is at least two orders of magnitude larger than the increment of interest.

To avoid the effects of the measurement noise, the derivative can be calculated, for example, as an increment in 1000 sampling intervals. However, this is not satisfactory for higher frequencies (e.g., 200 Hz would require calculating the increment in each sampling interval, because the whole period lasts 50 sampling intervals). An approximately constant number of increment-calculating periods is kept for one period of the current. However, calculating the time derivative as an increment over a certain time introduces a delay that must be taken into account. For implementation, it is typically enough to use a rough approximation (for example, a delay equals to a half of the increment-calculating period).

Starting from the part that appears in equation (3.26), this practical approximation yields:

$$\left(i_{\alpha s}\frac{di_{\beta s}}{dt} - i_{\beta s}\frac{di_{\alpha s}}{dt}\right)\frac{1}{\omega_e} = \qquad (20)$$

$$\left(i_{\alpha s}\frac{\Delta i_{\beta s}}{\Delta t} - i_{\beta s}\frac{\Delta i_{\alpha s}}{\Delta t}\right)T_e = i_{\alpha s}\Delta i_{\beta s}\frac{T_e}{\Delta t} - i_{\beta s}\Delta i_{\alpha s}\frac{T_e}{\Delta t}$$

In equation (20), $\Delta i_{xs}$ is an increment that the corresponding current makes for the time interval $\Delta t$, and $T_e$ is a period ($T_e=1/\omega_e$). The ratio $T_e/\Delta t$ is kept approximately constant. The constant $c=T_e/\Delta t$ defines the number of subintervals (in one period of the current) in which the increment will be calculated. The actual selection is determined experimentally and is typically in between 20 and 50. Using the constant c, the increment-calculating period can be defined as:

$$\Delta t = \frac{T_e}{c} \qquad (21)$$

Since $T_e$ is a variable that is available in the controller, the increment-calculating period $\Delta t$, can be calculated. If $T_e$ is expressed in sample intervals, then the value for $\Delta t$ is also in sample intervals. To calculate the current increment $\Delta i_{xs}$, the sample taken $\Delta t$ time ago is subtracted from the latest sample. Equation (14) is finally modified to the form suitable for implementation:

$$|\hat{\Psi}_r|^2 qL_rT_c - L_{\alpha s}L_rc(i_{\alpha s}\Delta i_{\beta s} - i_{\beta s}\Delta i_{\alpha s}) \qquad (22)$$

The reactive power q is calculated as $q=\hat{u}_{\beta s}i_{\alpha s}-\hat{u}_{\alpha s}i_{\beta s}\cdot L_{\alpha s}$ is the equivalent stator leakage inductance ($L_{\alpha s}=L_s\sigma$), and can be treated as a constant for most applications. If the leakage inductance depends strongly on the magnetizing current, it may be tabulated. The rotor inductance $L_r$ takes into account the nonlineanties in the main magnetic circuit.

The increments of current ($\Delta i_{xs}$) are obtained using the technique described earlier. This method introduces the delay in the derivative data that cannot be ignored. For this reason, the voltage and current variables involved in the computation (22) are delayed for the same time. Moreover, the currents, the derivatives, and voltages are filtered with low-pass filters denoted as LPF 102A, 102B and 102C in FIG. 6. The cut-off frequency of filters should be defined for the particular implementation. The main purpose of the LPF is to reduce the PWM switching frequency components from currents. Since the LPFs also introduce delay, the delays (of LPF, and variable delay from derivative calculation) is balanced at the input in an actual rotor flux calculating module 110.

The ariation of $R_r$ is slow (usually with the time constant on the order of magnitude of 10 s or more). Before subtracting the estimated value from $|\Psi_r|^2$ obtained from IFOC, the latter must be delayed for the same time as all other variables.

The difference between the estimated value and the value in IFOC is the error ($\Delta y$ in FIG. 6), which is mainly a consequence of a mistuned $R_r$. The other origins of the error lie in different imperfections in the estimation process. The most important are imperfectly estimated voltages, noise in current derivatives and imperfectly evaluated $L_r$.

Using the simplified form for the estimated voltages (16) and developing the expression for q in a Fourier series, it can shown that in steady state all components that originate from the dead time have frequencies that are multiples of the fundamental. Therefore, the mean value of these components in one period of the fundamental is zero. If the average of the error $\Delta y$ is calculated during one whole period $T_\theta(T_\theta=1/\omega_\theta)$, the errors caused by the dead time will be reduced. The same will reduce errors from the noise as well.

A filtering module (FILT) 120 in FIG. 6 calculates the average of $\Delta y$ for one period $T_\theta$. The filtering module 120 accumulates the error $\Delta y$ starting when $\theta_\theta$ is zero and ending the accumulation when $\theta_\theta$ becomes zero again. The average evaluated during this period is used as an error signal. $\theta_\theta$ is an angle between α-axis of the stationary frame and d-axis of the synchronous frame, and it is known in the controller.

As discussed previously, the sensitivity of the function $|\Psi_r|^2$ decreases significantly for very small loads. Therefore, the adaptation mechanism should be disabled for $i_{qs}$ lower than a predetermined value, which is dependent upon the actual limit should be defined for the actual implementation. The suspension of the adaptation mechanism for extremely low loads is not a disadvantage, because at low loads it is not particularly important whether the IFOC 60 is the well tuned or not. As soon as the load increases, the adaptation mechanism is to be enabled again.

An inhibiting module (INH) 124 in FIG. 6 inhibits the adaptation if the q-component of the stator current is lower than a predetermined value. In the disabled state, the output from this module is equal to zero. Finally, the error is output to the controller 60 via an integrating module (INT REG) 128. The output of the module is the estimated rotor resistance $R_r^*$, which is used in the IFOC 60.

Referring now to FIG. 4, experimental results of the rotor resistance adaptation controller 50 using the proposed adaptation function $y=/|\Psi_r|^2$ is shown. The error in upper plot is defined as:

$$\text{Error } [\%] = \frac{|\psi_r|^2 - |\check{\psi}_r|^2}{|\psi_r|^2} \cdot 100$$

As explained before, $|\overline{\Psi}_r|^2$ is the IFOC output, whereas $|\Psi_r|^2$ is calculated using the equation (14). An experiment was performed on a standard 3-phase industrial motor operating in steady state. The rotor flux reference was kept constant at 75% of the nominal value. Nominal torque was applied to the machine. The test was performed with the locked rotor ($\omega_r=0$), which represents the worst-case condition for the adaptation controller 50, due to the lowest value of $|\overline{S}_{R_r}^{|\Psi_r|^2}|$.

Figure 5:
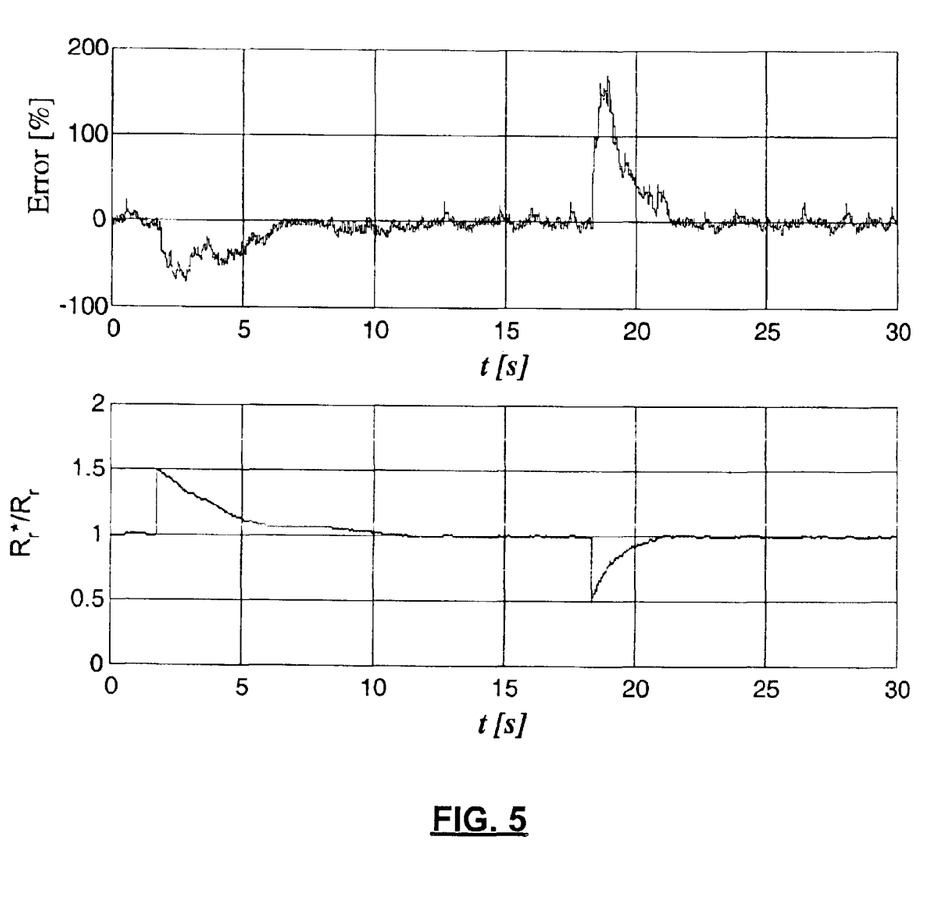
FIG. 5 are plots illustrating an error signal and a ratio of the estimated and true rotor resistance (bottom plot) for d-current (or flux) at 75% of its rated value and full (nominal) torque.

Two seconds after initiating the test, the $R_r$ value used in the IFOC controller 60 was intentionally increased by 50% from its actual value, which caused a parameter mismatch. As can be seen in FIG. 5, the rotor resistance parameter adaptor 80 corrected the rotor resistance value $R_r$ in the IFOC controller to the actual value in less than five seconds. Similarly, eighteen seconds after the start, the rotor resistance value $R_r$ in the IFOC controller 60 was intentionally reduced by 50% from its actual value. The rotor resistance parameter adaptor, again, quickly restored the rotor resistance parameter value $R_r$ to its actual value.

Those skilled in the art can now appreciate from the foregoing description that the broad teachings of the present invention can be implemented in a variety of forms. Therefore, while this invention has been described inr connection with particular examples thereof, the true scope of the invention should not be so limited since other modifications will become apparent to the skilled practitioner upon a study of the drawings, the specification and the following claims.

What is claimed is:

1. A control system for an induction machine including a rotor having rotor flux and a rotor resistance, wherein said induction machine outputs first and second reference current values, comprising:
   a first controller that outputs first and second reference voltage values to said induction machine and that generates an estimated rotor flux magnitude value based on a rotor resistance parameter;
   a computation circuit that receives said first and second reference current values from said induction machine and said first and second voltage reference values from said first controller and that calculates an actual rotor flux magnitude; and
   a rotor resistance adjustor that updates said rotor resistance parameter of said first controller based on said actual and estimated rotor flux magnitudes.

2. The control system of claim 1 further comprising a difference circuit that calculates a difference between said estimated and actual rotor flux magnitudes and that outputs said difference to said rotor resistance adjustor.

3. The control system of claim 1 wherein said first controller is an indirect field-oriented controller (IFOC).

4. The control system of claim 3 wherein said IFOC receives flux and torque producing stator current values.

5. The control system of claim 1 wherein said rotor resistance adjustor is disabled at rotor slip values below a predetermined threshold and is enabled aid predetermined threshold.

6. The control system of claim 1 wherein said computation circuit calculates said actual rotor flux magnitude based on an equation:

$$|\psi_r|^2 = \left((v_{\beta s} i_{\alpha s} - v_{\alpha s} i_{\beta s}) - L_s \sigma \left(i_{\alpha s} \frac{d i_{\beta s}}{dt} - i_{\beta s} \frac{d i_{\alpha s}}{dt}\right)\right) \frac{L_r}{\omega_e}$$

where $v_{\alpha s}$ and $v_{\beta s}$, are stator voltages in a stationary reference frame, $i_{\alpha s}$ and $i_{\beta s}$ are stator currents in the stationary reference frame, $L_s \sigma$ is an equivalent stator leakage inductance, $L_r$ and $\omega_e$ is a stator electrical frequency.

7. A control system for an induction machine including a rotor having rotor flux and a rotor resistance, wherein said induction machine outputs first and second reference current values, comprising:
   an indirect field-oriented controller (IFOC) that outputs first and second reference voltage values to said induction machine and that generates an estimated rotor flux magnitude value based on a rotor resistance parameter;
   a computation circuit that receives said first and second reference current values from said induction machine and said first and second reference voltage values from said IFOC and that calculates an actual rotor flux magnitude;
   a difference circuit that calculates a difference between said estimated and actual rotor flux magnitudes; and
   a rotor resistance adjustor that updates said rotor resistance parameter of said IFOC based on said difference.

8. The control system of claim 7 wherein said IFOC receives flux and torque producing stator current values.

9. The control system of claim 7 wherein said rotor resistance adjustor is disabled at rotor slip values below a predetermined threshold and enabled for rotor slip values above said predetermined threshold.

10. The control system of claim 7 wherein said computation circuit calculates said actual rotor flux magnitude based on an equation:

$$|\psi_r|^2 = \left((v_{\beta s} i_{\alpha s} - v_{\alpha s} i_{\beta s}) - L_s \sigma \left(i_{\alpha s} \frac{d i_{\beta s}}{dt} - i_{\beta s} \frac{d i_{\alpha s}}{dt}\right)\right) \frac{L_r}{\omega_e}$$

where $v_{\alpha s}$ and $v_{\beta s}$ are stator voltages in a stationary reference frame, $i_{\alpha s}$ and $i_{\beta s}$ are stator currents in the stationary reference frame, $L_s \sigma$ is an equivalent stator leakage inductance, $L_r$ is a rotor inductance and $\omega_e$ is a stator electrical frequency.

11. A method for controlling an induction machine including a rotor having rotor flux and a rotor resistance, wherein said induction machine outputs first and second reference current values, comprising:
   generating first and second reference voltage values using an indirect field-oriented controller (IFOC);
   generating an estimated rotor flux magnitude value using said IFOC based on a rotor resistance parameter;
   calculating an actual rotor flux magnitude based on said first and second reference voltage values and said first and second reference current values; and
   updating said rotor resistance parameter of said IFOC based on said actual and estimated rotor flux magnitudes.

12. The method of claim 11 further comprising:
   calculating a difference between said estimated and actual rotor flux magnitudes;
   using said difference in said updating step.

13. The method of claim 12 wherein said actual rotor flux magnitude is based on an equation:

$$|\psi_r|^2 = \left((v_{\beta s} i_{\alpha s} - v_{\alpha s} i_{\beta s}) - L_s \sigma \left(i_{\alpha s} \frac{d i_{\beta s}}{dt} - i_{\beta s} \frac{d i_{\alpha s}}{dt}\right)\right) \frac{L_r}{\omega_e}$$

where $v_{\alpha s}$ and v6, are stator voltages in a stationary reference frame, $i_{\alpha s}$, and $i_{\beta s}$ are stator currents in the stationary reference frame, $L_s \sigma$ is an equivalent stator leakage inductance, $L_r$ is a rotor inductance and $\omega_e$ is a stator electrical frequency.

14. The method of claim 13 wherein a stator leakage current $L_s \sigma$ in said equation is estimated from a lookup table.

15. The method of claim 11 wherein said first and second reference voltage values of said IFOC are based on flux and torque producing stator current values.

16. The method of claim 11 wherein updates to said rotor resistance are disabled at rotor slip values below a predetermined threshold and enabled for rotor slip values above said predetermined threshold.

17. The method of claim 16 wherein said predetermined threshold is approximately 1.4 rad/s.

* * * * *